United States Patent [19]

Dostoomian et al.

[11] 4,359,622
[45] Nov. 16, 1982

[54] CONTROLLER FOR SPOT WELDING

[75] Inventors: Ashod S. Dostoomian, Stoukhim; Alan A. Richard, Seekona; Alan C. Traub, Framingham; Riccardo Vanzetti, Brockton, all of Mass.

[73] Assignee: Vanzetti Infrared & Computer Systems, Inc., Canton, Mass.

[21] Appl. No.: 150,808

[22] Filed: May 19, 1980

[51] Int. Cl.³ ............................................. B23K 11/24
[52] U.S. Cl. .................................. 219/110; 219/91.2; 219/109; 219/119
[58] Field of Search ...................... 219/109, 110, 91.2, 219/119

[56] References Cited

U.S. PATENT DOCUMENTS

| | | | |
|---|---|---|---|
| 2,104,749 | 1/1938 | Jones | 219/110 |
| 2,233,617 | 3/1941 | Lamb | 219/110 |
| 2,817,747 | 12/1957 | Devonshire et al. | 219/110 |
| 2,848,595 | 8/1958 | Van Sciver | 219/110 |
| 3,370,151 | 2/1968 | Normando | 219/131 |
| 3,526,748 | 9/1970 | Rienks | 219/131 |
| 3,529,121 | 9/1970 | Bobo et al. | 219/109 |
| 3,602,687 | 8/1971 | Pollock | 219/130 |
| 3,666,949 | 5/1972 | DeFalco et al. | 250/83.3 |
| 4,024,371 | 5/1977 | Drake | 219/110 |
| 4,075,493 | 2/1978 | Wickersteim | 250/461 |
| 4,093,844 | 6/1978 | Fellure et al. | 219/124.02 |
| 4,121,087 | 10/1978 | Malmuth et al. | 219/121 L |
| 4,136,566 | 1/1979 | Christensen | 73/356 |
| 4,214,164 | 12/1979 | Traub et al. | 250/338 |

FOREIGN PATENT DOCUMENTS 1151353  5/1969  United Kingdom ............... 219/109

Primary Examiner—C. C. Shaw
Attorney, Agent, or Firm—Sughrue, Mion, Zinn, Macpeak & Seas

[57] ABSTRACT

A controller for a spot-welding machine compares the temperature evolution at a site at which a spot weld is being made to a standard thermal history stored in a digital read/write memory in controlling the welding current for the weld. Standard thermal histories can be generated and written into the memory as needed by an operator of the welding machine to take into account changes in operating conditions. The temperature evolution of the spot-welding operation is monitored by detecting radiant energy whose intensity provides a measure of a temperature of the weld. Phosphorescent radiation from a thermographic phosphor located in a welding tip of the welding machine and thermal infrared radiation are preferred for monitoring the temperature evolution of the spot-welding operation.

21 Claims, 10 Drawing Figures

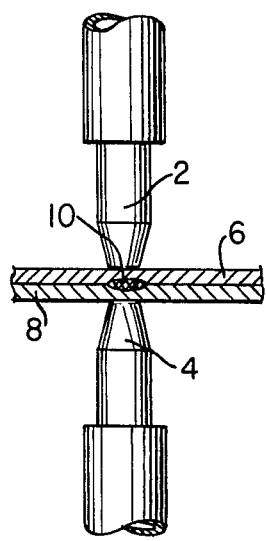
FIG. 1
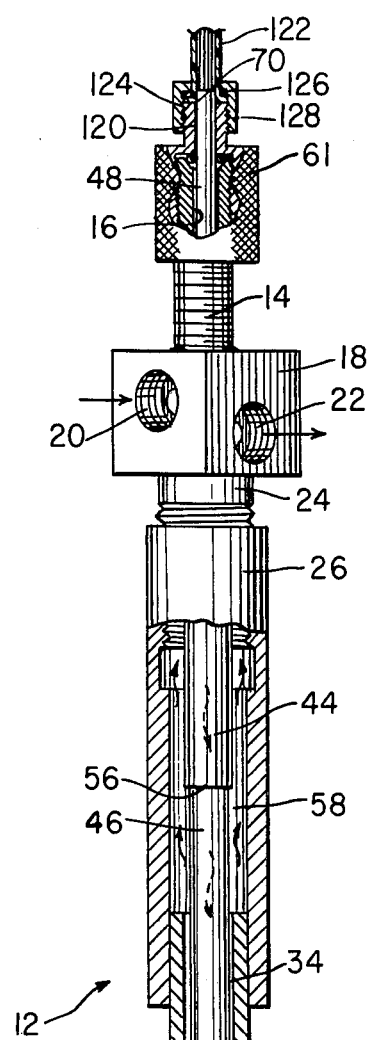
FIG. 2
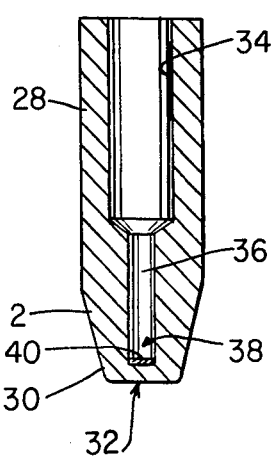
FIG. 3
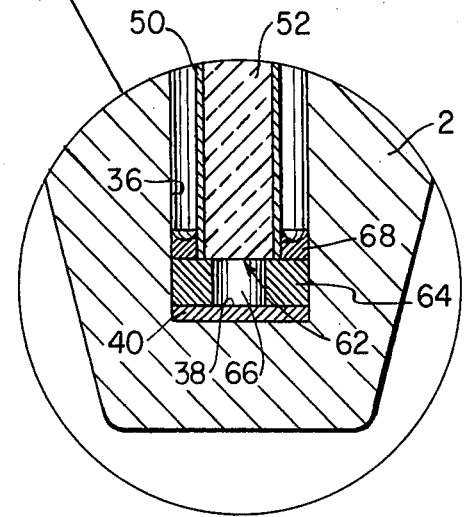

CONTROLLER FOR SPOT WELDING

DESCRIPTION

1. Technical Field

The present invention relates to spot welding, which is accomplished by localized electrical-resistance heating in the workpieces to be joined by welding. In particular, the invention concerns a method and apparatus for controlling operating parameters of a spot welder throughout the course of a welding operation in response to the temperature evolution of the weld.

In a typical spot welding process, two metal sheets to be welded together are pressed between two opposing welding tips of a spot welding machine. An electric current is then passed between the welding tips for a short time to heat the metal sheets resistively in the current path. The magnitude of the electric current and the length of time it is applied are selected so that the metal sheets fuse and coalesce in a region between the welding tips. The two sheets are thus welded together at a localized region, or "spot."

Many variables influence the quality of a spot weld, which has led to problems in producing welds consistently of acceptable quality. Among the factors which influence the quality of a spot weld is the pressure at the weld location, which can in turn be influenced in a generally unpredictable way by the warping of the workpieces and the wear, flattening, or other deformation of the welding tips. Variations in the initial temperature at a weld location at the time a welding current is first applied can cause variations in weld quality. Substantial variations in initial temperatures can result from heating from nearby welds. The magnitude of the welding current passing through a weld location has a direct influence on the weld quality. The magnitude of this current can be affected by variations in the line voltage supplying the welding machine which cause the total current flowing between the two welding tips to vary. Even if the total current is maintained constant, the current through the welding location can vary from weld to weld because of shunting of varying fractions of the current flowing between the welding tips through nearby welds or spark discharges. Differences in the thickness, cleanliness, and heat capacity of the workpieces can also lead to variations in weld properties when the welding current is held constant.

2. Background Art

Although spot welding machines are known in which certain welding parameters are regulated automatically by one means or another, none of these machines produces welds which are as uniform in quality in the face of the variations in operating conditions described above as is desired.

A controller for a spot welder described in U.S. Pat. application Ser. No. 926,055, now U.S. Pat. No. 4,214,055 monitors the temperature evolution of a welding operation to regulate the welding current to a limited extent. A welding tip of the spot welder is equipped with a well which extends to within a few millimeters of the face of the tip which is pressed against the workpiece. Since the welding tip makes thermal contact with the workpiece and is made of a thermally conductive material, usually a copper alloy, the temperature of the inner surface of the well rises and falls with the temperature of the location of the weld. The controller of the '055 application detects the temperature of an inner surface of the well once after the initiation of each spot welding operation by measuring the intensity of infrared radiation emitted by the surface and conveyed to a detector over a fiber-optic cable. A temperature thus measured at a predetermined time after the initiation of a welding operation is compared to a previously stored value and the welding current is adjusted to compensate for any difference between the two values. The welding current remains fixed at the adjusted value for the remainder of the welding operation.

The regulation of the welding current achieved with the controller of the '055 application is limited in a number of significant respects. Commercially practical fiber-optic cables attenuate infrared radiation strongly if the wavelength of the radiation is greater than a threshold wavelength, typically about 1.5 $\mu$m. Consequently when used with such cables, conventional solid-state infrared detectors do not respond to infrared radiation with wavelengths greater than about 1.5 $\mu$m as a practical matter. However, the lower the temperature of a surface, the greater the average wavelength of the thermal radiation it emits. As a result, the controller of the '055 application is unable to detect temperatures in the welding tip below about 66° C. This lack of sensitivity to low temperatures is made a disadvantage because the welding tips of a spot welder are generally cooled by circulating room-temperature water, with the result that a significant fraction of the time of a typical spot welding operation, roughly 10–20 percent ordinarily, is required to heat the surface in the welding tip whose infrared emissions are to be detected from room temperature to above 66° C. The existence of this relatively long "dead time" at the outset of each welding operation is a serious drawback, since it restricts the time available to compensate for variations in the welding conditions which are present at the beginning of the operation. In addition, the controller of the '055 application permits the welding current to be adjusted only once during each welding operation. Any change in the working conditions, such as a sudden change in the line voltage, which occurs during a welding operation subsequent to the time at which the adjustment is made cannot be compensated for during that welding operation.

DISCLOSURE OF THE INVENTION

We have invented an improved controller for spot welding which provides regulation of welding parameters throughout the course of a welding operation in response to heat generated by the welding operation, and which avoids the limitations of the prior art discussed above.

The present invention relates to a welding controller for a spot welder which has welding tips for injecting an electric welding current into a workpiece to produce a spot weld. The spot welder is capable of adjusting the magnitude of the welding current in response to a control signal applied to a control-signal input. For example, conventional spot welders often employ an ignitron-tube circuit for setting the magnitude of the welding current and have provision for receiving a pulse-width modulated control signal for determining the firing angle of the ignitron tubes which thereby sets the magnitude of the current.

Broadly, the controller of the invention comprises a radiant-energy sensor for generating an intensity level signal in response to the intensity of radiant energy illuminating the sensor. A radiant-energy conduit such as a fiber-optic bundle interconnects the welding tip and the sensor for collecting radiant energy in the welding tip, guiding the radiant energy to the sensor, and projecting the radiant energy upon the sensor. The intensity of the radiant energy provides a measure of the temperature of the weld.

The welding controller further comprises a digital read/write memory, such as a random-access memory, which has a plurality of accessible storage locations for storing digital data words. The welding controller also includes a timer for emitting a sequence of clock signals at timed intervals after the initiation of a welding operation. The clock signals are spaced apart by time intervals which are substantially shorter than the duration of a welding operation, so that a plurality of clock signals occur during the course of each welding operation. It is ordinarily preferred that the clock signals be spaced apart by less than about 25 ms and correspond to zero crossings of a main AC power signal. The controller further comprises an access location sequencer, such as an address generator for a random-access memory, for generating a predetermined sequence of access-location signals subsequent to receipt of a signal signifying the initiation of a welding operation. Each access-location signal is issued in response to receipt of a clock signal.

The controller can function in two different modes: an operation mode and a calibration mode. The operation mode corresponds to the reading of data words from the digital memory and the calibration mode corresponds to the writing of data words into memory. Thus the welding controller further includes a read/write selector switch for selectively enabling the reading of data words from the memory or the writing of data words into the memory.

The controller also includes an analog-to-digital converter connected between an intensity-level signal output of the radiant-energy sensor and a data-word input of the digital memory. Data words written into the memory in response to the access-location signals when the controller is in the calibration mode characterize the thermal history of a welding operation. The controller thus permits a welding machine operator to load a standard thermal history into the memory by carrying out a series of welding operations with the controller in the calibrating mode and switching to the operation mode after a satisfactory weld has been made, thereby retaining the thermal history of the satisfactory weld in the memory. Thermal histories preferably include at least 16 digital values.

The controller further includes a differencing circuit for generating an error signal when the controller is in the operation mode. The error signal is generated in response to intensity-level information from the radiant-energy sensor applied to a sensor-value input. At a time which corresponds to the issuance of an access-location signal by the access-location sequencer, the error signal encodes a measure of an arithmetic difference between the intensity level represented by the signal applied to the sensor value input and the value represented by a thermal-history data word read from a storage location in memory specified by the access-location signal. For example, the error signal could be a pulsed signal having pulses whose width is a measure of the arithmetic difference. The error signal can be applied to the control-signal input of the spot welder so that the magnitude of the welding current throughout the course of a welding operation is controlled in response to the temperature evolution of the weld as compared to the standard thermal history stored in the memory.

In a preferred embodiment of the invention, the differencing circuit includes a digital subtractor having a subtrahend input, a minuend input, and a difference output. One input communicates with a digital output of the analog-to-digital converter and the other input communicates with a data-word output of the digital memory so that data appearing at the difference output of the subtractor at a time corresponding to the issuance of an access-location signal is an approximate measure of an arithmetic difference between the value of the intensity level signal from the radiant-energy sensor at that time and the value represented by the thermal-history data word read from the storage location of the digital memory specified by the access-location signal. The differencing circuit further includes a pulse-width modulator connected to the difference output of the subtractor to convert digital data from the subtractor into a pulse-width modulated error signal. If desired, an arithmetic logic unit (ALU) of a microprocessor can serve as the subtractor in this embodiment. The microprocessor could also generate the access-location signals and thus serve as the access-location sequencer of the welding controller, and could generate the pulses for the pulse-width modulate error signal.

In a first preferred embodiment, one of the welding tips of the spot welder has a well extending into its interior. An interior surface of the well, preferably a surface closest to the end of the welding tip which contacts the workpiece, defines an indicator-emitter surface. A thermographic phosphor is coated on the indicator-emitter surface to make thermal contact with the welding tip. A thermographic phosphor has the property that the intensity of phosphorescent radiation emitted by the phosphor under appropriate illumination varies with the temperature of the phosphor. The intensity of the phosphorescent radiation from the phosphor on the indicator-emitter surface thus provides an approximate measure of the temperature of the surface, and consequently permits changes in the temperature of the workpiece which contacts the welding tip to be detected.

The welding controller of the first preferred embodiment further includes a phosphor-illumination source such as an ultraviolet lamp for supplying radiation for illuminating the thermographic phosphor. A bifurcated fiber-optic bundle interconnects the phosphor-illumination source, the thermographic phosphor in the welding tip, and the radiant-energy sensor. In particular, the fiber-optic bundle has a first branch, a second branch, and a trunk. The first branch has an optical port which is positioned to receive radiation from the phosphor-illumination source. The trunk of the fiber-optic bundle extends into the well of the welding tip, and has an optical port located in the vicinity of the phosphor. Radiation from the phosphor-illumination source can thus be conducted into the well by the fiber-optic bundle and projected on the thermographic phosphor from the optical port in the trunk. The optical port in the trunk can also receive phosphorescent radiation from the illuminated thermographic phosphor. An optical port of the second branch is positioned in the vicinity of the radiant-energy sensor so that phosphorescent radiation from the well is projected on the sensor. The detector should be sensitive to radiant energy of the wavelength of the phosphorescent radiation, which is in the visible wavelength range for typical thermographic phosphors.

Thermographic phosphors are commercially available which provide excellent sensitivity over temperature ranges which include room temperature. Consequently, it is possible to detect the heating induced in a workpiece by a welding operation early in the course of the operation even from within the interior of a water-cooled, copper-alloy welding tip. An embodiment of the present invention employing a welding tip having an indicator-emitter surface coated with a thermographic phosphor has a dead time between initiation of a welding operation and the availability of a signal measuring the heating of the operation which is roughly 15 percent less than the dead time of a conventional controller which relies upon infrared radiation emitted by an indicator-emitter surface and conveyed to a detector over conventional fiber-optic cables. The residual dead time of the embodiment of the present invention is a result of the thermal time lag involved in heating the workpiece and the end of the welding tip.

During a typical welding operation the indicator-emitter surface of the welding tip may range in temperature from ambient temperature, say roughly 25° C., to perhaps 300° C. or even higher. Conventional thermographic phosphors which are suitable indicators of temperatures in the vicinity of room temperature are generally not sensitive up to the maximum temperature which the indicator emitter surface can reach in normal operation. Consequently it may be desirable in some applications to divide the temperature range into two or more subranges and to detect the temperature by different methods in the different subranges.

For example, a mixture of two different thermographic phosphors could be used, each sensitive over a different subrange. Preferably, the two phosphors are selected so that the total intensity of phosphorescent radiation emitted by the two phosphors can be used as a measure of the temperature over the entire temperature range of interest, so that only a single radiant-energy detector is required.

Alternatively, phosphorescent radiation from a thermographic phosphor could be employed to measure the temperature over a lower temperature range, say from room temperature up to about 66° C. or higher, and thermal infrared radiation could be employed to measure the temperature over an upper temperature range, say from about 66° C. to the highest temperature of interest. The emissivities of typical thermographic phosphors are generally sufficiently high with respect to thermal infrared radiation to permit the indicator-emitter surface of the well of the welding tip to serve as the source of both the infrared and phosphorescent radiation when coated with the phosphor. In some cases, however, it may be preferable to compound a black pigment with the phosphor in order to increase the infrared emissivity. Alternatively, a fraction of the area of the indicator-emitter surface could be coated with a thermographic phosphor and the remainder coated with a high-emissivity pigment for the infrared. Since conventional radiant-energy detectors are generally not adequately sensitive both to thermal infrared radiation and to phosphorescent radiation emitted by typical thermographic phosphors, it will ordinarily be preferred to employ two detectors, one for the infrared radiation and one for the phosphorescent radiation. A fiber-optic bundle having a trunk and three branches could be employed to interconnect the phosphor-illumination source, the indicator-emitter surface in the well of welding tip, the phosphorescent radiation detector, and the infrared radiation detector.

The intensity of phosphorescent radiation from a thermographic phosphor typically decreases with increasing temperature, whereas the intensity of thermal radiation emitted by a surface increases with increasing temperature. Since the sign of the correction encoded by the error signal produced by the spot welding controller depends on whether or not the intensity of the radiant energy increases or decreases with increasing the temperature, the controller must take account of the direction of change of the intensity of the radiant energy with respect to changes in the temperature in order to generate an error signal encoding the proper sign for controlling the welding current. To facilitate a crossover between two temperature sensors corresponding to two temperature ranges having opposite directions of change of the level of intensity with respect to changes in temperature, an inverting amplifier can be connected to the output of one of the two radiant-energy sensors.

In a second preferred embodiment of the invention, infrared radiation emitted by the workpiece itself is used to measure a temperature of the weld. For this embodiment, a welding tip of the spot welder has a passageway extending through it which intersects the end of the welding tip which is pressed against the workpiece in a welding operation. The intersection of the passageway with the end of the welding tip defines a thermal-radiation entrance port for receiving thermal radiation emitted by the workpiece. A fiber-optic cable extends between the radiant-energy sensor of the controller and the welding tip, with an end of the cable being inserted in the passageway of the tip. A window element made of a heat-resistant, substantially infrared transparent material is mounted in the thermal-radiation entrance opening for transmitting thermal radiation emitted by the workpiece to an input port of the fiber-optic cable located in the passageway of the welding tip. Thus thermal infrared radiation emitted by the workpiece when the welding tip is in contact with the surface of the workpiece is directed to the sensor over the fiber-optic cable. As noted above, a conventional fiber-optic cable paired with a conventional solid-state infrared radiation detector cannot be used as a practical matter in detecting thermal radiation emitted by a surface below a threshold temperature; roughly 66° C. for conventional glass fiber optics, for example. However, the temperature of the surface of the workpiece in contact with the welding tip typically rises from room temperature to over 66° C. in a relatively short time, as compared to the time required for an interior surface of a water-cooled welding tip to reach 66° C. Consequently, the problem of a dead time between the initiation of a welding operation and the availability of a signal which is a measure of the heating of the welding operation is greatly reduced with this embodiment of the present invention, if not eliminated altogether. A possible disadvantage of this embodiment for some applications is that the intensity of the infrared radiation emitted by the surface of a workpiece depends on the emissivity of the workpiece, which can vary from point to point in some cases if the workpiece is not properly cleaned or prepared.

A welding tip is subject to wear and flattening as a number of welds are made. The temperature of surfaces in a well in a welding tip will in general be affected by such wear and deformation. In particular, as the layer of metal between the end of the well and the surface of the welding tip which contacts the workpiece becomes thinner, the temperature of surfaces in the well tends to increase even though the temperature of the surface of the workpiece remains constant.

The present invention permits such wear and deformation to be compensated for readily by simply recalibrating the controller. Preferred embodiments of the invention include a recalibration-indicator mechanism, which includes a recalibration indicator such as a panel light to notify the operator that a recalibration of the controller is required. In such embodiments a counter can be provided to count the total number of welds carried out subsequent to the most recent calibration of the controller or to count the number of welds in an unbroken sequence which require a reduction in welding current, which indicates that a temperature in the well of the welding tip is systematically registering too high. When the count stored in the counter reaches a predetermined limit, the operator is notified by the recalibration indicator that a recalibration is called for. If the controller includes a microprocessor, the microprocessor can be programmed to provide the counting function.

Welding controllers of the present invention which employ welding tips having a window for admitting thermal radiation emitted by a workpiece generally also require recalibration from time to time. Recalibration can be required because the thermal radiation passing through the window element can become progressively attenuated as the outer surface of the window clouds over with material deposited during welding. A recalibration-indicator mechanism can therefore be used to advantage to notify an operator that a recalibration is required. As with the embodiments described in the preceding paragraph, a counter can be provided to count, for example, the total number of welds carried out subsequent to the most recent calibration of the controller. As an alternative, the counter could tally the number of welds in an unbroken sequence which require an increase in welding current, which indicates that the thermal radiation passing through the window in the welding tip is being systematically attenuated. As in the preceding embodiments, when the count reaches a predetermined limit the operator is notified by a recalibration indicator that a recalibration is called for.

BRIEF DESCRIPTION OF THE DRAWINGS

The details of the invention will be described in connection with the accompanying drawings.

FIG. 1 is a side view in partial section of a pair of welding tips of a spot welding machine during a welding operation.

FIG. 2 is a side view in partial section of a welding tip assembly.

FIG. 3 is a cross-sectional side view of a welding tip for the welding-tip assembly of FIG. 2.

BEST MODE FOR CARRYING OUT THE INVENTION

Figure 4:
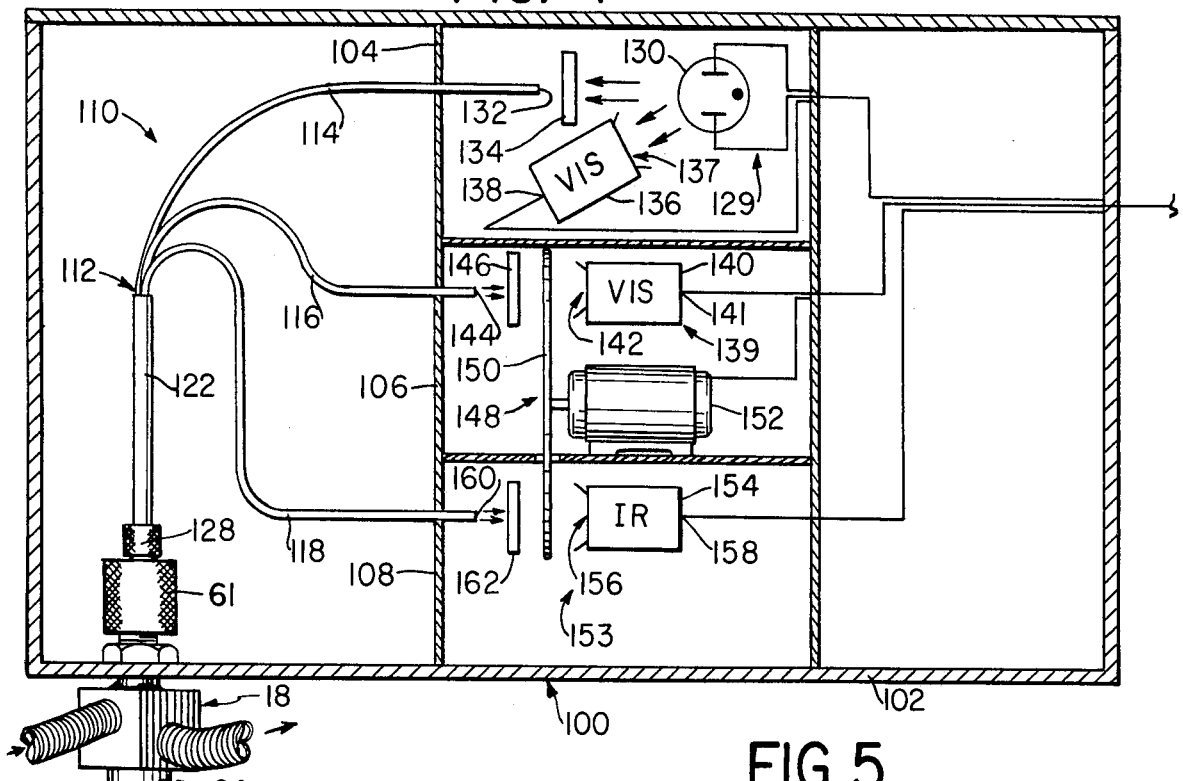
FIG. 4 is a schematic diagram of a welding-tip temperature-detector assembly attached to the welding tip assembly of FIG. 2.

Turning now to FIG. 1, a first welding tip 2 and a second welding tip 4 of a welding machine are disposed in coaxial alignment on opposite sides of a first metallic worksheet 6 and a second metallic worksheet 8. A welding current passed between the first and second welding tips causes a region 10 of the worksheets between the welding tips to fuse and coalesce, thereby forming a spot weld.

Referring now to FIG. 2, a welding-tip assembly 12 has an optical-cable connector post 14, which is threaded for connecting the assembly 12 to a fiber-optic bundle as illustrated in FIG. 4 below. A light-pipe passageway 16 extends generally coaxially through the connector post 14. A coolant fitting 18 is attached to the connector post 14 and has a coolant inlet 20, a coolant outlet 22, and a sleeve-attachment fitting 24. A tip-assembly sleeve 26 is attached at a first end to the sleeve-attachment fitting 24 of the coolant fitting 18 and at a second end to a welding tip 2. The welding-tip assembly 12 is joined electrically and mechanically to the spot-welding machine by a connector fitting (not shown) which clamps around the tip-assembly sleeve 26.

As may be seen best in FIG. 3, the welding tip 2 has a generally cylindrical shank 28 and a tapered end 30. A contact surface 32 of the tapered end 30 makes contact with worksheets to be welded. A bore 34 extends into the welding tip 2 generally coaxially with the shank 28. A well 36 extends from the bore 34 towards the contact surface 32. A surface in the well which is closest to the contact surface 32 defines an indicator-emitter surface 38. A thermographic phosphor 40 coats the indicator-emitter surface 38 of the well 36. A preferred thermographic phosphor is a ZnCdS compound doped with silver and nickel, which is designated "Radelin" Thermographic Phosphor Type 1807 by the producer, United States Radium Corporation, of Morristown, N.J. This thermographic phosphor has an effective temperature range of from room temperature to 80° C., and in this temperature range emits visible phosphorescent radiation which is orange in color when illuminated with ultraviolet radiation. The thickness of the layer of metal separating indicator-emitter surface 38 from the contact surface 32 is preferably as thin as possible, consistent with the need for the welding tip to withstand the pressure of a welding operation. For welding tips made of conventional copper alloy, the thickness of metal between the contact surface 32 and the indicator-emitter surface 38 is preferably 2 to 3 mm.

Turning again to FIG. 2, an outer coolant inlet tube 44 extends from the coolant fitting 18 into the interior of the tip-assembly sleeve 26 generally coaxially with the sleeve. An inner coolant inlet tube 46 extends from the coolant fitting 18 coaxially through the interior of the outer coolant inlet tube 44 and into the bore 34 of the welding tip 2. A light-pipe 48 extends generally coaxially through the light-pipe passageway 16 of the connector post 14 and the interior of the inner coolant inlet tube 46 and into the well 36 of the welding tip 2. The light pipe 48 comprises a stainless-steel jacket 50 surrounding a rod 52 made of a material such as silica glass which is substantially transparent to ultraviolet radiation.

The diameter of the light pipe 48 is less than the inside diameter of the inner coolant inlet tube 46 so that an inner annular channel 54 for the coolant flow is defined between the inner coolant inlet tube 46 and the light pipe 48. The inner channel 54 permits coolant to flow from the coolant inlet 20 of the coolant fitting 18 into the bore 34 of the welding tip 2 for cooling the welding tip. Similarly, an outer annular channel 56 is defined between the inner and outer coolant inlet tubes 46 and 44 to permit coolant to flow from the coolant inlet 20 of the coolant fitting 18 into the interior of the tip-assembly sleeve 26 for cooling the tip assembly. A coolant return channel 58 comprises: (a) an annular space between the inner surface of the bore 34 of the welding tip 2 and the outer surface of the inner coolant inlet tube 46, (b) an annular space between the inner surface of the tip assembly sleeve 26 and outer surfaces of the coolant inlet tubes 44 and 46, and (c) a passageway extending through the sleeve-attachment fitting 24 of the coolant fitting 18 to communicate with the coolant outlet 22. Thus a coolant such as water introduced into the coolant inlet 20 of the coolant fitting 18 flows through the inner and outer annular channels 54 and 56 into the interior of the tip assembly 12 and returns through the coolant-return channel 58 to be discharged from the coolant outlet 22.

An O-ring 60 encircles the jacket 50 of the light pipe 48 where the light pipe exits the light-pipe passageway 16 of the connector post 14. A connector post cap 61 is threaded on the connector post 14 and urges the O-ring 60 against the connector post 14 to make a fluid-tight seal between the light pipe 48 and the wall of the light-pipe passageway 16. Coolant is thereby prevented from leaking out of the tip assembly 12 through the light-pipe passageway 16.

A first end of the light pipe 48 located in the well 36 of the welding tip 2 defines a first optical port 62 of the light pipe. A spacer ring 64 is positioned between the first end of the light pipe 48 and the indicator-emitter surface 38 of the welding tip 2 generally coaxially with the light pipe 48 and the well 36 of the welding tip 2. The inside diameter of the opening of the spacer ring 64 is smaller than the outside diameter of the light pipe 48, so that an enclosed air space 66 is defined by the radially inner wall of the spacer ring 64, the first end of the light pipe 48, and the indicator-emitter surface 38. An annular bead 68 of a high-temperature sealant is bonded to the spacer ring 64, the outer surface of the light pipe 48 and the inner surface of the well 36 to seal the air space 66 from the coolant. A preferred sealant for the annular bead 68 is a high-temperature epoxy formulation designated "EPO-TEK 390" by the producer, Epoxy Technology, Inc. of Billerica, Massachusetts.

A second end of the light pipe 48 located externally of the connector post 14 of the welding tip assembly 12 defines a second optical port 70 of the light pipe. The light pipe 48 can therefore conduct ultraviolet light for illuminating the thermographic phosphor 40 into the well 36, project ultraviolet light on the phosphor 40, receive phosphorescent radiation emitted by the phosphor 40, and conduct the phosphorescent radiation from the welding-tip assembly.

FIG. 4 illustrates an interfacing of the welding-tip assembly 12 to a welding-tip temperature monitoring assembly 100. A generally light-tight housing 102 encloses an ultraviolet source compartment 104, a phosphorescence-detector compartment 106, and a thermal-radiation-detector compartment 108. The ultraviolet source compartment 104, the phosphorescence-detector compartment 106, and the thermal-radiation detector compartment 108 are substantially optically shielded from one another.

A branched-fiber-optic bundle 110 includes a trunk 112, a first branch 114, a second branch 116, and a third branch 118. As shown best in FIG. 2, the trunk 112 terminates at a trunk optical port 120 which is positioned in surface-to-surface contact with the second optical port 70 of the light pipe 48. The trunk 112 is surrounded by a jacket 122 which has a rim 124 which projects radially outward from the jacket 122 at the end of the trunk. A resilient washer 126 surrounds the trunk 112 and is urged against the rim 124 by a cable connector fitting 128 which is threaded onto the connector post cap 61. A component of the force transmitted by the resilient washer 126 to the rim 124 of the jacket 122 of the trunk 112 is transmitted in turn to the second end of the light pipe 48 across the end of the trunk 112. Consequently, the light pipe 48 is urged into the welding tip assembly 12 with the first optical port 62 of the light pipe 48 being pressed against the spacer ring 64 in the well 36 of the welding tip 2. The resilient washer 126 accommodates differences in the thermal expansion of the light pipe 48 and the welding-tip assembly 12 during the heating of a welding operation.

Returning to FIG. 4, an ultraviolet source 129 includes a mercury-vapor ultraviolet lamp 130 located in the ultraviolet-source compartment 104 for illuminating the thermographic phosphor. Model UL80-7025-01 mercury lamp available from BHK, Inc. of South El Monte, California is a preferred ultraviolet lamp. The first branch 114 of the fiber optic bundle 110 extends into the compartment 104 and terminates close to the ultraviolet lamp 130 to receive ultraviolet radiation from the lamp through a first branch optical input port 132. The first branch 114 of the fiber optic bundle 110 is comprised of fused-quartz fibers, which transmit ultraviolet radiation efficiently. Alternatively, fibers made of purified, fused silica or silicon-tetrachloride glass could be used in the first branch 114. An ultraviolet-transparent optical filter 134 is interposed between the ultraviolet lamp 130 and the input port 132. The filter absorbs radiation in the visible and infrared spectral regions, but is effectively transparent to ultraviolet light. Thus radiant energy outside the ultraviolet spectral region emitted by the lamp which might interfere with the operation of the radiant-energy sensors described below which are sensitive to visible and infrared radiation is greatly attenuated by the ultraviolet-transparent optical filter 134.

A radiant-energy sensor 136 is located in the ultraviolet-source compartment 104 and has an illumination port 137 and an ultraviolet-intensity output 138. The radiant-energy sensor 136 is positioned to intercept radiation from the ultraviolet lamp 130. A Schottky-type GaAsP photodiode which is sensitive to ultraviolet radiation such as photodiode type No. G1125 available from Hamamatsu Corporation of Middlesex, New Jersey is preferred for radiant-energy sensor 136. The sensor 136 produces an ultraviolet-intensity-level signal at its output 138 which is a function of the intensity of the ultraviolet radiation from the lamp 130. Thus the sensor 136 permits the intensity of the ultraviolet radiation which illuminates the thermographic phosphor to be monitored.

A phosphorescence detector 139 includes a visible-light sensor 140 located in the phosphorescence-detector compartment 106. The second branch 116 of the fiber optic bundle 110 leads into the phosphorescence-detector compartment 106 and terminates in the vicinity of the visible-light sensor 140. The visible-light sensor 140 produces a signal at a phosphorescence-intensity-level output 141 which is a function of the intensity of phosphorescent radiation in the visible wavelength range illuminating an illumination port 142 of the sensor. A diffusion-type GaAsP photodiode such as photodiode type No. G1115 available from Hamamatsu Corporation identified above is a preferred example of the visible-light sensor 140. An end of the second branch 116 defines a second branch optical output port 144 which is positioned and oriented to direct radiant energy passing from the output port 144 onto the illumination port 142 of the visible-light sensor 140.

A phosphorescene-transparent optical filter 146 is positioned in the light path between the second branch optical output port 144 and the illumination port 142 of the sensor 140. The phosphorescence-transparent optical filter 146 is substantially transparent to the phosphorescent radiation emitted by the thermographic phosphor in the welding tip, but absorbs radiation in the infrared and ultraviolet spectral regions to reduce any interference radiant energy in these frequency ranges may cause. When the phosphorescent radiation is visible light which is orange in color, any one of "Wratten Filters" Nos. 12, 21, 22, 26, and 29 available from Eastman Kodak Company of Rochester, New York is preferred for the phosphorescence-transparent optical filter 146.

A light chopper 148 includes a slotted disk 150 driven at a controlled rotational velocity by a synchronous electric motor 152, with the slotted disk 150 interposed in the light path between the second branch optical output port 144 and the visible-light sensor 140 for periodically interrupting the light falling on the detector at a chopper frequency. Since the light falling on the illumination port 142 is chopped, the phosphorescence-intensity level signal will approximate a rectangular wave, with a lower-intensity portion of the rectangular wave representing a dark-current signal and the greater-intensity portion representing the sum of the dark current signal and a signal corresponding to the intensity of the phosphorescent radiation. Thus the signal corresponding to the intensity of the phosphorescent radiation will have Fourier components at the chopping frequency and its harmonics and can be effectively separated from the dark current signal, which is principally a zero-frequency (DC) signal.

A thermal-radiation detector 153 includes an infrared-radiation sensor 154 mounted in the infrared-detector compartment 108. The infrared-radiation sensor 154 has an illumination port 156 and a thermal-radiation intensity-level output 158. A plate-type lead-sulfide detector such as the Type B3 lead-sulfide photo-conductor available from Infrared Industries, Inc. of Waltham, Massachusetts is preferred for the infrared-radiation sensor 154. The third branch 118 of the fiber optic bundle 110 extends into the compartment 108 and terminates to define a third-branch optical output port 160. The third-branch optical output port 160 is positioned and oriented to project thermal infrared radiation passing out of the port onto the illumination port 156 of the infrared-radiation sensor 154. An infrared-transparent optical filter 162 is positioned in the light path between the third-branch optical output port 160 and the illumination port 156. The optical filter 162 is effectively transparent to infrared radiation, but strongly absorbs radiation in the ultraviolet and visible spectral regions in order to reduce any interference radiation in these regions may have on the infrared-radiation sensor 154. The infrared-radiation sensor and the third-branch optical output port 160 are positioned so that the slotted disk 150 of the light chopper 148 intersects the light path between them. Thus the thermal infrared radiation falling on the illumination port 156 of the infrared-radiation detector 154 can be periodically interrupted to permit the dark current signal from the infrared-radiation detector 154 to be effectively separated from the signal corresponding to the intensity of the thermal infrared radiation.

Figure 5:
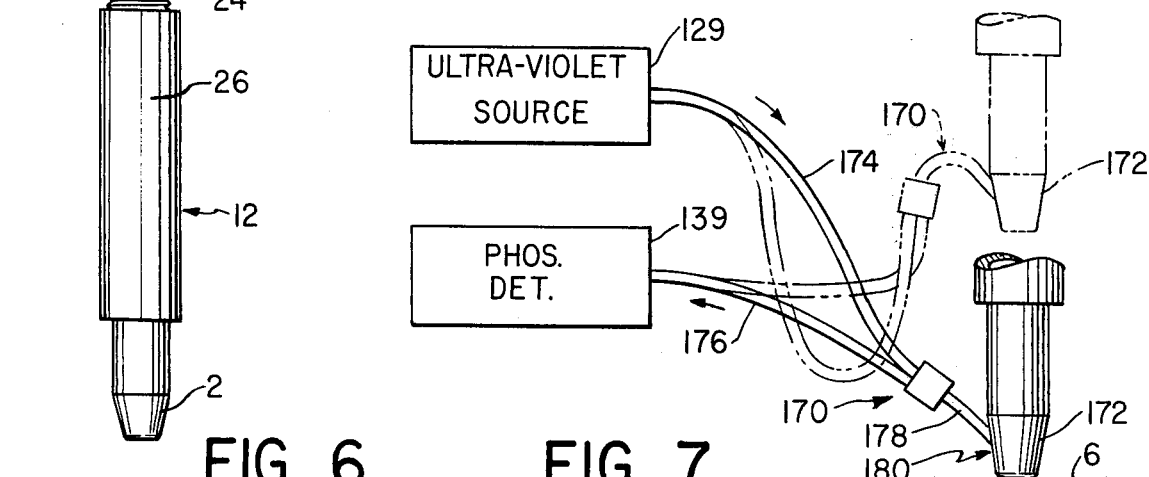
FIG. 5 is a schematic diagram of a welding-tip temperature-detector assembly comprising an ultraviolet source, a phosphorescence detector and a welding tip interconnected by a bifurcated fiber-optic bundle.

An alternative embodiment of the invention is illustrated in FIG. 5. A bifurcated fiber optic bundle 170 interconnects a dry-well welding tip 172 with an ultraviolet source 129 and a phosphorescence detector 139. The fiber-optic bundle 170 has a first branch 174, a second branch 176, and a trunk 178. The fiber-optic bundle 170 is flexible to permit the welding tip 172 to be withdrawn from worksheets 6 and 8. The trunk 178 extends into a well 180 of the welding tip 172. The dry-well welding tip 172 is adapted for attachment to conventional welding-tip assemblies. As shown best in FIG. 6, the dry-well welding tip 172 tapers to a contact surface 32 and has a bore 34 extending into it to permit a flow of coolant. The well 180 extends obliquely into an end of the welding tip 172. A surface 182 of the well which is closest to the contact surface 32 of the welding tip defines an indicator emitter surface 184 of the well. A thermographic phosphor 186 coats the indicator-emitter surface 184.

The trunk 178 of the fiber-optic bundle 170 extends into the well 180 and terminates to define a trunk optical port 188. A spacer ring 190 maintains a gap between the trunk optical port 188 and the surface of the thermographic phosphor 186. The gap permits ultraviolet radiation projected from the fibers of the first branch 174 of the fiber-optic bundle 170 to spread laterally and thereby illuminate the entire indicator-emitter surface 184 substantially uniformly. The fibers making up the first and second branches 174 and 176 are interspersed randomly at the trunk optical port 188 to facilitate the uniform illumination of the indicator-emitter surface 184. The gap equals roughly one or two fiber diameters in length. The gap length for the maximum intensity of phosphorescent radiation measured at an output port of the second branch 176 is best determined empirically, since the surface condition of the phosphor 186 is a factor in determining the optimum gap length.

Turning again to FIG. 5, the ultraviolet source 129 of FIG. 5 is essentially identical to the ultraviolet source 129 discussed above in connection with FIG. 4. The first branch 174 extends to the vicinity of an ultraviolet lamp mounted in the ultraviolet source 129 for receiving ultraviolet radiation for illuminating the thermographic phosphor 186. The fibers of the first branch 174 are made of a material which is substantially transparent to ultraviolet radiation. The phosphorescence detector 139 of FIG. 5 is essentially identical to the phosphorescence detector 139 discussed above in connection with FIG. 4. The second branch 176 extends to the vicinity of an illumination port of a visible-light sensor mounted in the phosphorescence detector 139 for projecting phosphorescent radiation from the thermographic phosphor 186 onto the illumination port of the sensor.

Figure 7:
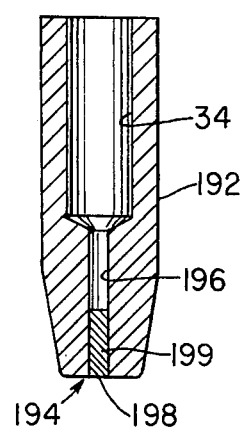
FIG. 7 is a cross-sectional view of a windowed welding tip which has a thermal-radiation entrance port in the end of the tip which contacts a workpiece.

Turning now to FIG. 7, a windowed welding tip 192 has a bore 34 extending into it similar to the bore 34 of the welding tip 2 illustrated in FIG. 3. An end of the welding tip defines a contact surface 194 for making contact with workpieces to be welded. A passageway 196 extends from the bore 34 through the contact surface 194 generally coaxially with the welding tip 192. The intersection of the passageway 196 with the contact surface 194 defines a thermal-radiation entrance port 198. A generally cylindrical window element 199 having a first face and a second face is mounted in passageway 196 with the first face generally flush with the contact surface 194.

The window element 199 is made of a material which is sufficiently strong to withstand the pressure of a welding operation, has a sufficiently high melting point to withstand the temperatures of welding, and is effectively transparent to thermal infrared radiation. A melting point in excess of 600° C. is preferred. A machinable glass ceramic available from Corning Glass Works of Corning, New York under the trade name "Macor" is a preferred material for the window element 199. Sintered aluminum oxide, diamond, ruby, and sapphire are alternative materials for the window element 199. However, it is preferable for the material of the window element 199 to be comparable in abradability to the material of which the welding tip 192 is made, so that the end of the welding tip will wear evenly, particularly when the welding tip is "dressed" abrasively by the welding operator to renew the contact surface 194. The machinable glass ceramic identified above is generally more comparable in abradability to copper-alloy welding tips than the other materials listed.

The window element 199 can be secured in the passageway 196 by a press fit or bonded in place with a high-temperature adhesive or solder. The welding tip 192 can be mounted in a welding-tip assembly of the type shown in FIG. 2, with the first end of the light pipe 48 of the welding-tip assembly 12 being mounted against the second face of the window element 199 in the same way as the first end of the light pipe is shown mounted against the indicator-emitter surface 38 in FIG. 2. Thermal radiation emitted by the workpiece during a welding operation can pass through the window element 199 and be guided by the light pipe 48 to a fiber-optic cable and thence to an infrared detector. The surface of a workpiece heats relatively quickly to a temperature in excess of about 66° C., as compared to the indicator-emitter surface 38 of the welding tip 2 illustrated in FIG. 3, for example. Thermal radiation from a surface in excess of about 66° C. typically has an average wavelength sufficiently short to be transmitted by conventional fiber optics and detected by conventional infrared sensors.

Figure 6:
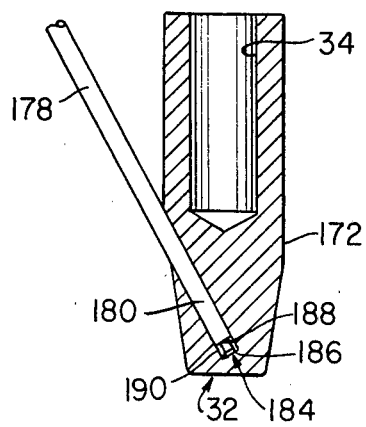
FIG. 6 is a cross-sectional side view of a dry-well welding tip having a well extending into it obliquely with respect to an axis of the tip.
Figure 8:
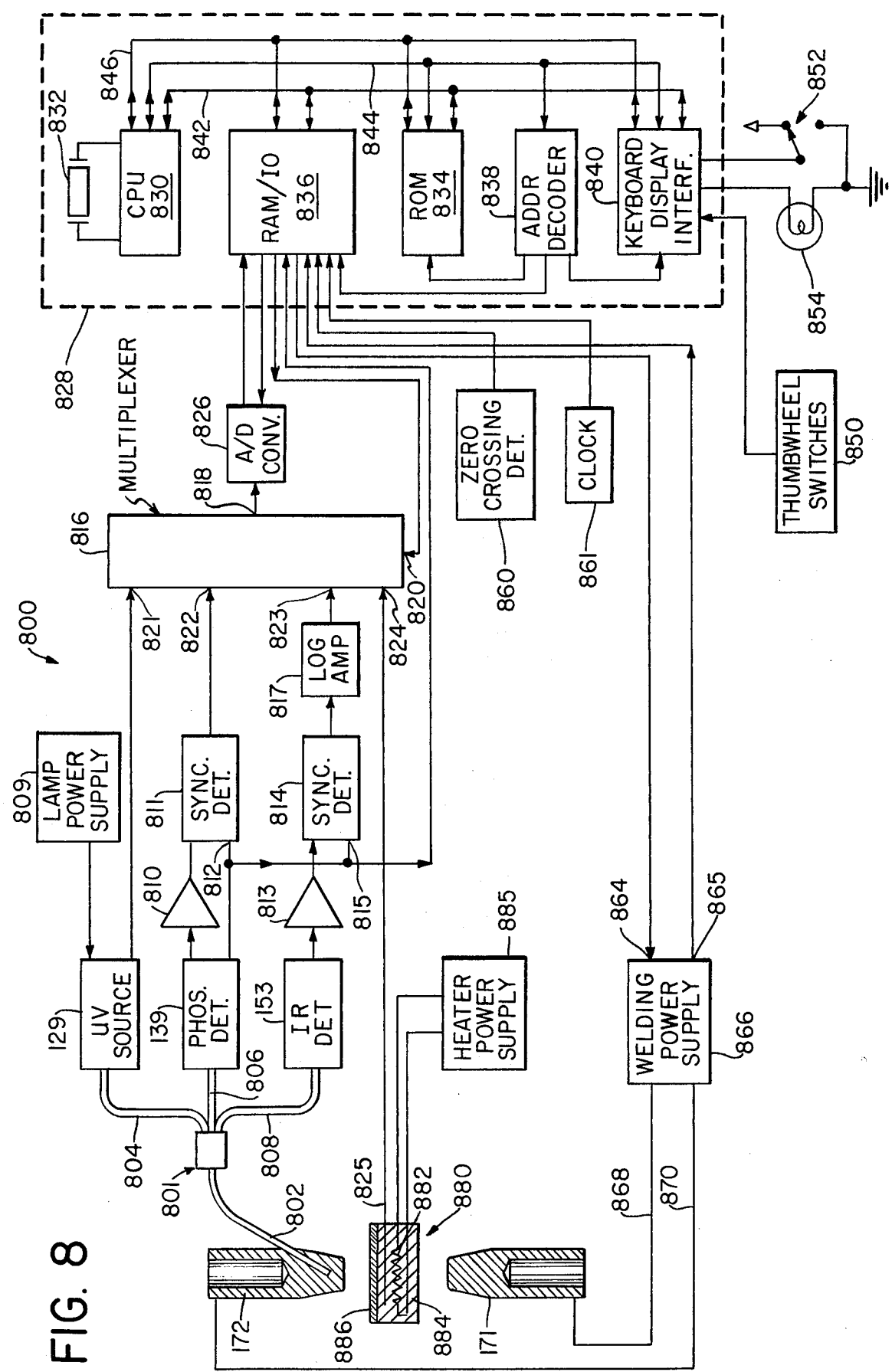
FIG. 8 is a schematic diagram of a spot welding controller of the present invention which employs a microcomputer.

Turning now to FIG. 8, a schematic diagram of a spot welding controller 800 of the present invention is illustrated. Although a welding tip 172 of the type illustrated in FIG. 6 is shown, it will be appreciated that welding tips of the other designs may be used as well. A branched fiber-optic bundle 801 has a trunk 802, a first branch 804, a second branch 806, and a third branch 808. The trunk 802 extends into the well 180 of the welding tip 172 and terminates just short of the layer of thermographic phosphor 186 on the indicator-emitter surface 184, as is illustrated in FIG. 6. The first branch 804 is connected to the ultraviolet source 129 for receiving ultraviolet light for illuminating the thermographic phosphor. The ultraviolet source 129 is illustrated in FIG. 4 and, for conciseness, will not be described further here. A lamp power supply 809 for energizing the ultraviolet lamp 130 is connected to the ultraviolet source 129. The second branch 806 of the fiber optic bundle 801 is connected to a phosphorescence detector 139 of the type described in connection with FIG. 4. The second branch 806 directs phosphorescent radiation from the thermographic phosphor to a visible-light sensor 140 in the detector 139. Finally, the third branch 808 of the fiber optic bundle 801 is connected to the thermal-radiation detector 153, which is also illustrated in FIG. 4. The third branch 808 directs thermal infrared radiation from the indicator-emitter surface in the welding tip to an infrared sensor 154 in the thermal-radiation detector 153.

The phosphorescence-intensity-level output 141 of the visible-light sensor 140 in the phosphorescence detector 139 illustrated in FIG. 4 is connected to a signal input of a first AC amplifier 810 of FIG. 8, whose output is in turn connected to a first synchronous detector 811. A reference frequency input 812 of the first synchronous detector 811 is connected to the synchronous electric motor 152 which rotates the slotted disk 150 of the light chopper 148 illustrated in FIG. 4, to receive a chopping frequency signal from the light chopper 148. The chopping-frequency signal oscillates at a frequency equal to the frequency at which the light illuminating the visible-light sensor 140 is interrupted by the rotating slotted disk 150. The circuit of the first synchronous detector 811 is a conventional lock-in detector circuit. The first synchronous detector 811 carries out a phase-sensitive conversion of the signal from amplifier 810 to produce a detected signal at the output which corresponds generally to the Fourier component at the chopping frequency of the chopped phosphorescence-intensity-level signal. Since the dark-current component of the signal from the visible-light sensor 140 is essentially a DC signal with at most a small Fourier component at the chopping frequency, the dark-current component is effectively eliminated by the first AC amplifier 801 and the first synchronous detector 811.

A second AC amplifier 813 is connected to the thermal-radiation intensity-level output 158 of the infrared-radiation sensor 154 of the thermal-radiation detector 153. An output of the second amplifier 813 is connected to a signal input of a second synchronous detector 814. A reference-frequency input 815 of the second synchronous detector 814 is connected to the synchronous electric motor 152 of the light chopper 148 to permit the second synchronous converter to carry out a phase-sensitive conversion of the thermal-radiation intensity-level signal from the infrared-radiation sensor 154. The infrared radiation illuminating the infrared-radiation sensor 154 is chopped by the light chopper 148 thereby permitting the dark-current component of the signal from the sensor to be effectively eliminated by the second AC amplifier 813 and the second detector 814. A logarithmic amplifier 817 is connected to the output of the second synchronous detector 814 to compensate in part for a nonlinear dependence of the signal at the output of the second synchronous detector 814 on the temperature of the indicator-emitter surface 184 of the welding tip 172.

An analog multiplexer 816 has four analog inputs 821, 822, 823, and 824 which can be selectively connected to an analog output 818 in response to a digital line-select signal applied to a line-select input 820. The first analog input 821 of the multiplexer 816 is connected to the radiant-energy sensor 136 of the ultraviolet source 129 illustrated in FIG. 4. The second analog input 822 is connected to the output of the first synchronous detector 811. The third analog input 823 is connected to the output of the logarithmic amplifier 817. The fourth analog input 824 of the multiplexer 816 is connected to a thermocouple 825, which is described below. The analog output 818 of the multiplexer 816 is connected to an analog signal input of an analog-to-digital converter 826.

A microcomputer 828 includes a central processing unit (CPU) 830; a read-only memory unit (ROM) 834; a random-access-memory/input-output unit (RAM/IO) 836; an address decoder 838; and a keyboard/display interface unit 840. Preferred components for the microcomputer 828 include the following integrated circuits: 8085 CPU; 2708 ROM; 8155 RAM/IO; 8205 address decoder; and 8279 keyboard/display interface. These preferred components are available from Intel Corporation, Santa Clara, Calif., as elements of their "MCS-85 Microcomputer System". A crystal-controlled central-processor clock 832 is connected to the CPU 830 to provide timing signals. The CPU 830 is connected to the ROM 834, the RAM/IO 836, the address decoder 838 and the keyboard/display interface 840 by three bidirectional buses: a data/address bus 842; an address bus 844; and a control bus 846. Both the RAM/IO unit 836 and the ROM unit 834 comprise a plurality of integrated circuits to obtain sufficient storage capacity. The operating principles and preferred interconnection of elements of the "MCS-85 Microcomputer System" are described fully in literature readily available from Intel Corporation. Consequently, the operation of the microcomputer 828 will not be described in detail here.

A digital output of the analog-to-digital converter 826 is connected to a first input/output port of the RAM/IO unit 836. A second input/output port of the RAM/IO unit 836 is connected to the line-select input 820 of the multiplexer 816 and to a control-signal input of the analog-to-digital converter 826, to permit the microcomputer 828 to select a signal at one of the four inputs 821-824 of the multiplexer 816 to be digitized by the analog-to-digital converter 826. An array of thumbwheel switches 850 is connected to the keyboard/display interface 840 to permit operating parameters and other control information for the spot welding controller 800 to be entered into the microcomputer 828. Examples of such control information include the magnitude of the welding current during calibration, the duration of the pulse of welding current, and a count limit for the recalibration-indicator mechanism of the controller. A calibrate/operate switch 852 is connected to the keyboard/display interface 840 to permit the mode of operation of the spot-welding controller 800 to be selected. A recalibration indicator lamp 854 is connected to the keyboard/display interface unit 840. The lamp 854 may be turned on and off under the control of the CPU 830. It is to be understood that the keyboard/display interface unit 840 includes a lamp driver circuit and other conventional interface circuitry to supplement the 8279 keyboard/display interface integrated circuit noted above.

A third input/output port of the RAM/IO unit 836 is connected to three sources of timing signals: a zero-crossing detector 860, the light chopper 148, and a crystal-controlled timer clock 861. The zero-crossing detector 860 is connected to the main AC power source and produces a train of pulses synchronized to the zero crossings of the main AC power signal. The rising edge of each pulse produced by the zero-crossing detector 860 marks a zero crossing of the power signal from the main power source which supplies a welding power supply 866. The width of the pulses is selected so that the falling edge of the pulse marks a zero crossing of the welding current produced by the welding power supply 866, thereby compensating for a phase shift introduced by a transformer in the power supply. When the line frequency is 60 Hz, the pulses from the zero crossing detector 860 are spaced by approximately 8.33 ms. As noted above, the light chopper 148 supplies a chopping-frequency signal whose frequency equals the frequency at which phosphorescent and infrared radiation is interrupted by the slotted disk 150 of the light chopper 148. The timer clock 861 operates at about 200 times the line frequency so that the time interval between zero crossings of the power signal can be divided into subintervals with approximately a one percent resolution.

The welding power supply 866 supplies an AC welding current drawn from the main power source to two welding tips 171 and 172 over conduits 868 and 870. The power supply includes a pair of ignitron tubes (not shown) which can be fired half-cycle by half-cycle to control the magnitude of the welding current. The length of time an ignitron tube remains conductive durng a half cycle is determined by the width of an ignitron-firing pulse applied to a firing-control input 864 of the power supply 866. The firing-control input 864 is connected to a fourth input/output port of the RAM/IO unit 836 of the microcomputer 828. The microcomputer 828 can therefore determine the magnitude of the welding current by transmitting a pulse-width modulated control signal synchronized with the line frequency to the firing-control input 864 of the welding power supply 866.

A weld-initiate output 865 of the welding power supply 866 is connected to the fourth input/output port of the RAM/IO unit 836 of the microcomputer 828. A weld-initiate signal appears at the weld-initiate output 865 to signal the activation of a foot-pedal switch (not shown) by which an operator calls for a pulse of welding current for a welding operation.

Calibration of the welding controller can be accomplished by setting the calibrate/operate switch 852 to a position calling for calibration and repeatedly carrying out spot welding operations until a satisfactory weld is obtained. Once a weld has been found to be satisfactory, the calibrate/operate switch 852 is set to the operate position, storing the thermal history of the welding operation in the memory of the RAM/IO unit 836 as described in detail below.

Instead of performing an actual welding operation to calibrate the spot-welding controller 800, a calibration can be carried out by using a calibration heater block 880 to simulate a welding operation. The calibration heater block 880 includes a heating element 882 in thermal contact with a heater plate 884. A heater power supply 885 is connected to the heating element 882 for energizing the heating element to heat the plate 884. A heat-transfer layer 886 of a relatively soft metal coats the heater plate 884. Examples of suitable soft metals are brass, aluminum, and alloys of lead, tin, antimony, bismuth, and indium. A temperature of the heater plate 884 can be measured by the thermocouple 825 which, as noted above, is connected to the multiplexer 816. By heating the calibration heater block 880 to a predetermined temperature and squeezing it between the two welding tips 171 and 172 to press it against the contact surface 32 of the welding tip 172, the welding tip 172 is heated in much the way it is heated by a workpiece in a welding operation. The thermal history of this heating can serve as a standard thermal history for the spot welding controller. The thermal history measured by this procedure is preferably normalized by the microcomputer 828 with a scale factor proportional to the temperature of the calibration heater block 880 measured with the thermocouple 825.

Figure 9:
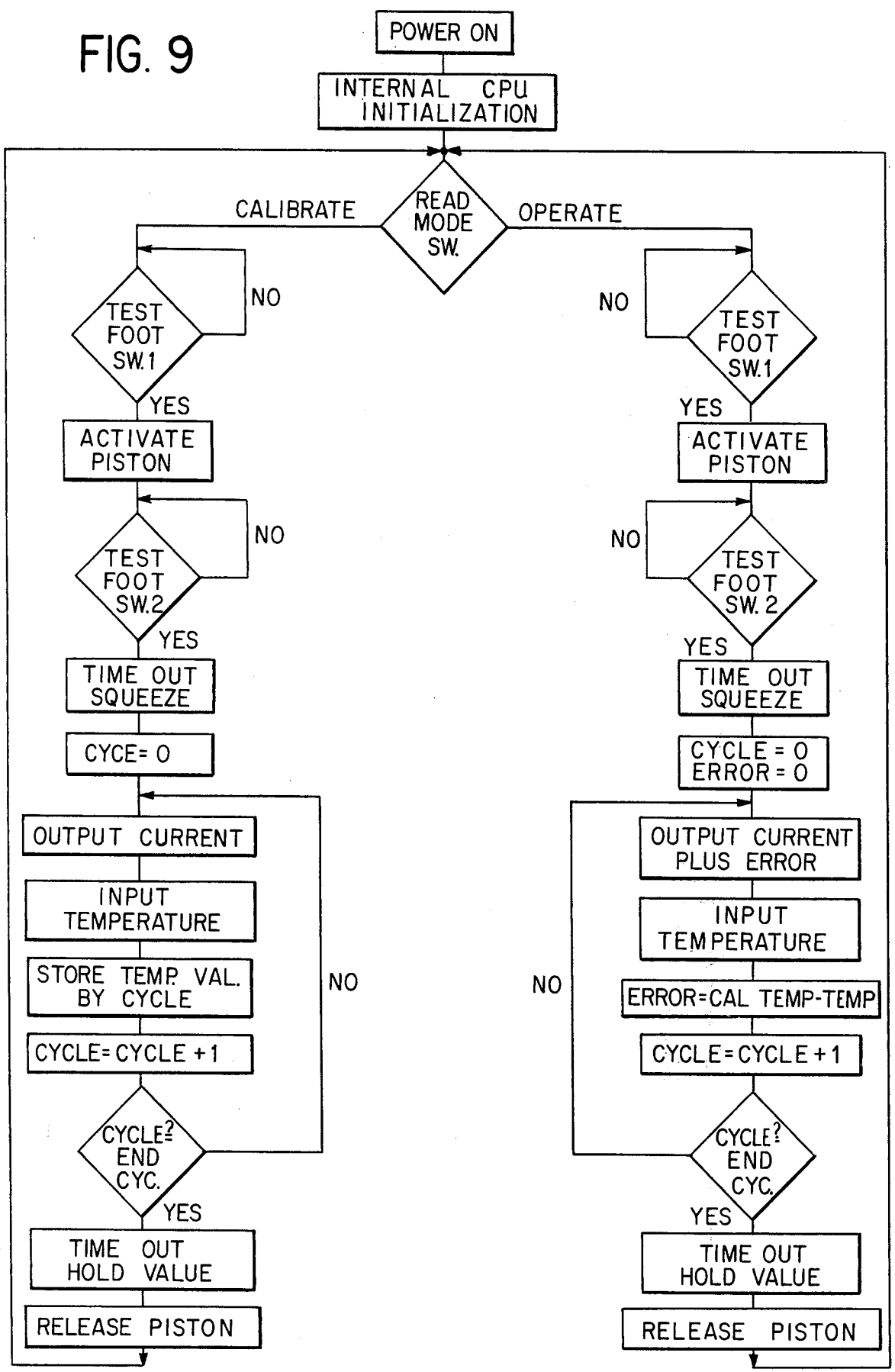
FIG. 9 is a flow chart of a program for the microcomputer of FIG. 8.

FIG. 9 provides a flow diagram of a computer program for a microprocessor-controlled welding controller of the invention. Greater detail may be found in an assembly-language listing of the program which is being filed with this application to be made a part of the file history of the application. The assembly-language listing is incorporated by reference in the present specification.

The intensity of the phosphorescent radiation emitted by the thermographic phosphor 186 in the well 180 of the welding tip 172 depends upon the intensity of the ultraviolet radiation illuminating the phosphor as well as on the temperature of the phosphor. For this reason the radiant-energy sensor 136 is provided in the ultraviolet-source compartment 104 to monitor the intensity of the ultraviolet lamp 130. The radiant-energy sensor 136 is sensitive to radiation in both the visible and ultraviolet regions of the spectrum. Although the ultraviolet lamp 130 produces some radiant energy in the visible wavelength range, the visible radiant energy is generally proportional in intensity to the intensity of the ultraviolet radiation generated by the lamp 130. Consequently, the signal produced by the radiant-energy sensor 136 is generally representative of the intensity of the ultraviolet radiation produced by the ultraviolet lamp 130. The microcomputer 828 can obtain data which encodes values of the ultraviolet-intensity-level signal from the radiant-energy sensor 136 and data which encodes values of the phosphorescence intensity-level signal from the visible-light sensor 140 by connecting the analog-to-digital converter 826 to the first and second analog inputs 821 and 822 respectively of the multiplexer 816. By computing the ratio of the intensity of the phosphorescent radiation to the intensity of the ultraviolet radiation illuminating the thermographic phosphor, the microcomputer 828 can obtain a digital value which is representative of the temperature of the indicator-emitter surface 184 on which the thermographic phosphor 186 is coated, and which is relatively insensitive to variations in the intensity of the ultraviolet radiation from the ultraviolet lamp 130 which illuminates the phosphor.

An alternative strategy for compensating for variations in the intensity of ultraviolet radiation illuminating a thermographic phosphor is described in U.S. Pat. No. 4,075,493 to Wickersheim. It will be recognized that the intensity ratio technique described in the '493 patent could be adapted for use in the present spot welding controller.

If the lamp power supply 809 energizing the ultraviolet lamp 130 is an alternating-current (AC) power supply, the intensity of the ultraviolet radiation generated by the lamp will in general be modulated by twice the frequency of the AC voltage from power supply. Such modulation of the ultraviolet radiation can lead to problems in spite of the ratio techniques described above.

The most direct way to avoid the problems relating to modulation of the ultraviolet radiation is to use a direct-current (DC) power supply for the lamp power supply 809. A DC power supply is satisfactory for this application, although the polarity should preferably be reversed from time to time to ensure that the electrodes in the ultraviolet lamp 130 wear evenly. Reversing the polarity after each welding operation is preferred.

A second preferred method for reducing the effects of modulation of the ultraviolet radiation illuminating the thermographic phosphor is for the lamp power supply 809 to supply an AC voltage having a frequency which is much greater than the chopping frequency of the light chopper 148. The output of the phosphorescence detector 139 would then comprise a train of bursts of pulses, the pulses within a burst appearing at twice the frequency of the lamp power supply 809 and the bursts appearing at the chopping frequency of the light chopper 148. The first synchronous converter 811 can detect a Fourier component of this signal at the chopping frequency of the light chopper 148 and thus provide a detected signal which is a measure of the intensity of the phosphorescent radiation from the thermographic phosphor 186 substantially free of the effects of the dark current of the visible-light sensor 140 and substantially free of the modulation of the ultraviolet radiation illuminating the phosphor. The frequency of the voltage energizing the ultraviolet lamp 130 must be taken into account in specifying a ballast circuit for the lamp, since such circuits generally include reactive circuit elements.

A third preferred method for reducing the effects of modulation of the ultraviolet radiation illuminating the thermographic phosphor is to synchronize the sampling of the intensity-level signal with the modulation of the ultraviolet radiation. Such synchronization can be particularly appropriate if the welding current from the welding power supply 866 is an AC current derived from the same line-frequency power source as the AC voltage from the lamp power supply 809, and the welding current can be varied only cycle-by-cycle, or half-cycle by half-cycle. If the welding current is changed only once each cycle of half cycle, sampling the phosphorescence intensity-level signal more frequently than once each cycle or half cycle, as the case may be, can be inefficient. For example, if the lamp power supply 809 produces a 60-Hz voltage for energizing the ultraviolet lamp 130, the signal from the first synchronous detector 811 could be digitized by the analog-to-digital converter 826 and read by the microcomputer 828 at a rate of 120 Hz, in synchronism with the voltage from the lamp power supply. A timing signal for synchronizing operations of the microcomputer 828 with the line frequency is supplied to the third input/output port of the RAM/IO unit 836 of the microcomputer from the zero-crossing detector 860. The chopping frequency of the light chopper 448 is preferably much greater than 120 Hz in this case, and the bandwidth of the first synchronous detector 811 preferably greater than 120 Hz to permit the detected signal at the output of the converter to track the 120 Hz variations in the phosphorescence-intensity-level signal. A chopping frequency of 3,000 Hz and a converter bandwidth of 600 Hz could be used, for example. The sampling of the signal from the first synchronous detector 811 is preferably phased so that the signal is digitized at a time of maximum intensity.

Operation of the spot welding controller 800 will now be described. In both the calibration and operation modes, ultraviolet radiation from the ultraviolet lamp 130 is conveyed into the well 180 of the welding tip 172 by the first branch 804 of the fiber optic bundle 801. The ultraviolet lamp 130 is powered by a 60 Hz voltage from the lamp power supply 809 and therefore the intensity of the ultraviolet radiation is modulated at 120 Hz. The thermographic phosphor 186 phosphoresces under the influence of the ultraviolet radiation with an intensity which depends upon the temperature of the phosphor and which is also modulated at 120 Hz. The phosphorescent radiation emitted by the thermographic phosphor 186 is conveyed to the phosphorescence detector 139 by the second branch 806 of the fiber-optic bundle 801. The surface of the thermographic phosphor 186 also continuously emits thermal radiation. When the temperature of the phosphor exceeds roughly 66° C., the average wavelength of the thermal radiation is sufficiently short to permit the third branch 808 of the fiber-optic bundle 801 to transmit the radiation without excessive attenuation.

To calibrate the spot welding controller 800, an operator sets the calibrate/operate switch 852 to the calibrate position and enters trial values for the magnitude of the welding current and for the duration of the welding current pulse into the microcomputer 828 via the thumbwheel switches 850. A workpiece of the type to be welded in the operation mode is placed between the two welding tips 171 and 172 and a foot-pedal switch (not shown) attached to the welding power supply 866 is actuated to squeeze the two welding tips together and to call for the pulse of welding current specified on the thumbwheel switches 850. The microcomputer 828 receives a signal via the fourth input/output port of the RAM/IO unit 836 that the foot-pedal switch has been actuated, and in turn transmits a train of ignition-firing pulses to the firing-control input 864 of the welding power supply 866.

Each ignitron-firing pulse in the train occurs during a terminal portion of a half cycle of the main power signal as shifted in phase by the welding power supply 866, as discussed above. To form such a pulse, the microcomputer 828 loads a firing-delay counter register with an initial count and begins decrementing the count at the falling edge of a pulse from the zero-crossing detector 860, which marks a zero crossing of the phase-shifted main power signal. The count is decremented at intervals marked by receipt of signals from the timer clock 861. When the count in the register reaches zero, the microcomputer 828 initiates an ignitron-firing pulse. The pulse is maintained until the time marked by the next falling edge of a pulse from the zero crossing detector 860. The initial count loaded in the firing-delay counter register is selected to provide a width for the ignitron-firing pulses which results in a welding current with a magnitude specified on the thumbwheel switches. The microcomputer 828 maintains the train of ignitron-firing pulses for the length of time specified on the thumbwheel switches for the trial pulse of welding current.

The flow of the trial welding current through the workpiece between the two welding tips 171 and 172 causes the workpiece to be heated resistively. As the temperature in the workpiece rises, the temperature of the indicator-emitter surface 184 of the welding tip 172 also rises, since the contact surface 32 of the welding tip 172 is being pressed against the workpiece. Consequently, the temperature of the thermographic phosphor 186 increases, causing the intensity of the phosphorescent radiation to decrease. The increase in temperature of the indicator-emitter surface 184 also leads to a change in the thermal infrared radiation emitted by the phosphor coating the indicator-emitter surface. In particular, as the temperature increases, the intensity of the thermal infrared radiation increases and the average wavelength decreases.

Phosphorescent radiation from the thermographic phosphor 186 is projected from the second branch 806 of the fiber-optic bundle 801 onto the illumination port 142 of the visible-light sensor 140 in the phosphorescence detector 139. The phosphorescent radiation is periodically chopped by the rotating slotted disk 150 of the light chopper 148 at a chopping frequency of several kilohertz, which is much higher in frequency than the 120-Hz modulation of the phosphorescent radiation. Consequently, the signal produced by the visible-light sensor 140 includes an essentially zero frequency dark-current component and an approximately rectangular wave at the chopping frequency whose envelope is modulated at 120 Hz. The first synchronous detector 811 obtains a Fourier component at the chopping frequency of the signal from the visible-light sensor 140. The detected phosphorescence-intensity level signal from the first synchronous detector 811 therefore represents the 120-Hz modulated intensity of the phosphorescent radiation from the thermographic phosphor 186. The peaks of the 120-Hz modulation of the signal from the first synchronous detector 811 thus measure the temperature of the indicator-emitter surface 184.

At the initiation of the welding operation, the analog-to-digital converter 826 begins digitizing the signal from the first synchronous detector 811 at a rate of 120 Hz in response to commands from the microcomputer 828. This corresponds to digitizing the signal once approximately every 8.3 msec. The digitizing of the detected phosphorescence intensity-level signal is phased with respect to the half cycles of the 60-Hz line frequency to ensure that the signal is digitized at approximately the time of maximum intensity. The signal from the radiant energy detector 136 which monitors the intensity of the ultraviolet radiation from the ultraviolet lamp 130 is also digitized by the analog-to-digital converter at the 120-Hz rate at times close to the times of maximum intensity. For each half cycle of the 60-Hz line frequency at the outset of the welding operation, the microcomputer 828 computes the ratio of the digital value of the phosphorescence intensity to the value of the ultraviolet radiation intensity to define a phosphorescence ratio. The phosphorescence ratios are stored in sequence in memory locations in the RAM/IO unit 836. The sequence of stored ratio values constitute a first segment of a thermal history of the trial weld.

As the temperature of the indicator-emitter surface 184 in the welding tip 172 increases during the course of the trial welding operation, the intensity of the phosphorescent radiation decreases, so that the values of the phosphorescence ratios decrease correspondingly. As each phosphorecence ratio is stored, the microcomputer 828 compares the phosphorecence ratio being stored against a crossover-limit ratio. The crossover-limit ratio corresponds to a temperature of 66° C. When a first phosphorescence ratio is encountered which is less than the crossover-limit ratio, the microcomputer 828 stores the address of the memory location in which that phosphorescence ratio is to be stored to define a crossover memory location. The microcomputer 828 then directs that the detected thermal-infrared intensity-level signal from the second synchronous detector 814 be digitized and stored at the 120-Hz rate. Thus, when the temperature of the indicator-emitter surface 184 exceeds a value specified by the crossover-limit ratio, the microcomputer 828 switches from phosphorescent radiation to thermal-infrared radiation to measure the temperature of the surface, to take advantage of the greater temperature sensitivity of the thermal infrared radiation in the upper temperature range compared to that of the phosphorescent radiation. Digitized values from the thermal-infrared intensity-level signal are stored at the 120 Hz rate until the end of the time specified for the trial pulse of welding current. Thus the thermal history stored in the memory of the RAM/IO unit 836 includes a first segment made up of phosphorescence ratios and a second segment made up of thermal-infrared intensity-level values. The crossover memory location stored in the microcomputer 828 marks the division between the first and second segments of the stored thermal history. For a pulse of welding current 0.5 sec in length, the thermal history is made up of about 60 digital values in total.

The operator continues to adjust the trial welding current and the trial welding duration until a satisfactory weld is produced. After a trial weld has been judged to be satisfactory by the operator, the calibrate/operate switch 852 is placed in the operate position. In this position the thermal history stored in the memory of the RAM/IO unit 836 is not altered by the subsequent welding operations, but is used as a standard thermal history to control the magnitude of the welding current throughout the course of the subsequent welding operations.

When the operator actuates the foot-pedal switch of the welding power supply 866 to initiate a welding operation in the operation mode, the microcomputer 828 is notified via the fourth input/output port of the RAM/IO unit 836. The microcomputer 828 then directs the analog-to-digital converter 826 to digitize a series of phosphorescence-intensity-level values at times synchronized with half cycles of the line frequency. Measured from the initiation of the welding operation, these times correspond to the times at which the standard-thermal-history values were stored in the memory of the RAM/IO unit 836. At each such time at the outset of the welding operation, a phosphorescence ratio is computed as described above and a standard-thermal-history value is read from the RAM/IO unit 836. The standard-thermal-history value is subtracted from the corresponding phosphorescence ratio in an arithmetic logic unit of the CPU 830 to define an error difference value. The error difference value is then used to determine the width of ignitron-firing pulse as follows. The error difference value, multiplied by a first positive scale factor which determines the loop gain of the control system, is subtracted from a nominal initial count to obtain a corrected initial count. The corrected initial count is loaded into the firing-delay counter register. After a time marked by the falling edge of a pulse from the zero-crossing detector 860, the count in the firing-delay counter register is decremented at intervals determined by signals from the timer clock 861. When the count reaches zero, an ignitron-firing pulse is formed which remains on until the time marked by the falling edge of the next pulse from the zero-crossing detector 860. The ignitron-firing pulse is transmitted to the firing control input 864 of the welding power supply 866 to switch on an ignitron tube in the power supply for a fraction of a half cycle of the main power signal determined by the width of the ignitron-firing pulse. The effect of subtracting the product of the error difference value and the scale factor from the nominal initial count is to adjust the width of the ignitron-firing pulse from a nominal value to a value which tends to reduce the difference between the measured phosphorescence ratio and the corresponding standard thermal history value.

The microcomputer 828 compares the address of the standard thermal-history value being read from the memory to the crossover memory location stored during the calibration operation. When the current address equals the crossover memory location, the microcomputer 828 directs that the detected thermal-infrared intensity-level signal from the second synchronous converter 813 be digitized for the remainder of the welding operation. Thus, the crossover from the thermographic-phosphor temperature measuring technique to the thermal-infrared temperature measuring technique is made to occur at a time after the initiation of a welding operation in the operation mode which essentially equals the time at which the crossover occurred during the standard welding operation in the calibration mode.

After the crossover occurs, the measured thermal-infrared intensity-level values are subtracted from the corresponding standard-thermal-history values by the microcomputer 828. This difference value is the negative or the difference computed before the crossover. In this way the sign of changes in the welding current specified by the error signal, resulting from changes of a given sign in the temperature of the indicator-emitter surface is constant on either side of the crossover, even though the intensity of the phosphorescent radiation decreases with increasing temperature and the intensity of the thermal infrared radiation increases with increasing temperature. (Alternatively, an inverting amplifier could be connected between the logarithmic amplifier 817 and the third input 823 of the multiplexer 816 to compensate for the difference in the effect a temperature change has on the intensity of thermal infrared radiation and on the intensity of phosphorescent radiation.) In addition, the microcomputer 828 multiplies the difference value obtained from the thermal-infrared intensity-level values and the second segment of the standard thermal history by a second positive scale factor to compute the error difference values. The second scale factor is chosen so that the loop gain of the spot-welding controller 800 is approximately the same for both the thermographic-phosphor temperature measuring technique and the thermal-infrared-radiation temperature measuring technique.

The error difference values computed after the crossover occurs are treated by the microcomputer 828 just as the error difference values were before the crossover. The train of ignitron-firing pulses derived from the error difference values is transmitted to the firing-control input 864 of the welding power supply 866 to determine the magnitude of the welding current until the end of the time specified for the pulse of welding current.

After that time, no further ignitron-firing pulses are transmitted, thereby switching off the welding current.

Throughout the course of each welding operation, a running sum of the error difference values is maintained by the microcomputer 828. A negative sum after a welding operation is completed indicates that, on average, the temperature of the indicator-emitter surface 184 was higher than the corresponding values during the calibration operation. A positive value of the sum indicates that, on average, the temperature was lower. A recalibration count is maintained by the microcomputer 828. The recalibration count is set to zero after each calibration run. If the sum is positive after a welding operation, the recalibration count is again set to zero. If the sum is negative after a welding operation, the count is incremented by one. When the recalibration count exceeds a count limit value entered on the thumbwheel switches, the recalibration indicator lamp 854 is lit, indicating that the spot-welding controller 800 should be recalibrated.

In the embodiment of the controller of the present invention illustrated in FIG. 8, an arithmetic logic unit in the CPU 830 generates digital error-signal values by subtracting current intensity-level values from corresponding intensity-level values of a standard thermal history stored in the memory of the RAM/IO unit 836. An alternative controller of the invention in which an error signal is generated by an analog circuit is illustrated schematically in FIG. 10.

Figure 10:
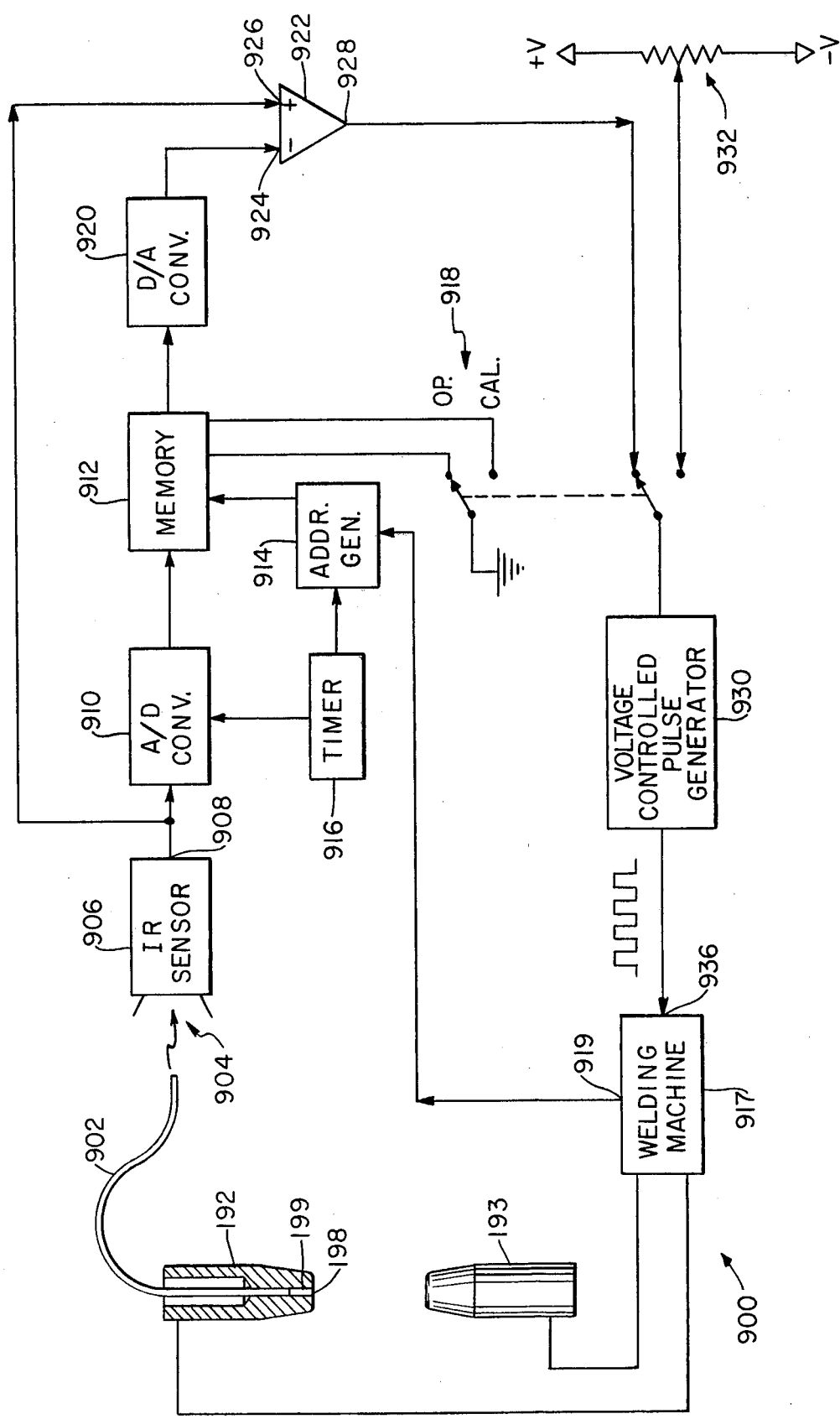
FIG. 10 is a simplified schematic diagram of a spot welding controller of the invention which employs an analog differencing circuit for generating an error signal.

Turning now to FIG. 10, a spot-welding controller 900 includes a windowed welding tip 192 of the type described in connection with FIG. 7, connected to a fiber-optic cable 902. One end of the fiber-optic cable 902 is located in the vicinity of an illumination port 904 of an infrared sensor 906, so that thermal infrared radiation emitted by a workpiece during a welding operation can be projected on the illumination port 904. A thermal-radiation intensity-level output 908 of the infrared-radiation sensor 906 is connected to an analog signal input of an analog-to-digital converter 910. A digital output of the analog-to-digital converter 910 is connected to a write input of a digital read/write memory 912. An address input of the memory 912 is connected to a count output of a binary-counter address generator 914. A count-increment input of the address generator 914 is connected to a timer 916 which generates clock pulses for incrementing in digital address count stored in the address generator 914. The timer 916 is also connected to a control input of the analog-to-digital converter 910 to coordinate the digitizing of the signal by the analog-to-digital converter 910 with the writing of the digitized data word into the memory 912 at a memory location specified by the address generator 914. A clear input of the binary-counter address generator 914 is connected to a weld-in-progress signal output 919 of a welding machine 917 to clear the address generator to an initial address at the leading edge of a weld-in-progress signal generated by the welding machine 917. The weld-in-progress signal is a logic one during the time a pulse of welding current is being supplied to the welding tips 191 and 192 by the welding machine 917, and a logic zero at other times. The duration of the pulses of welding current is controlled by the welding machine 917 in this embodiment.

A calibrate/operate switch 918 is a double-pole, double-throw switch, a first side of which is connected to a read/write-select input of the memory 912. When the calibrate/operate switch 918 is in a calibrate position, the writing of data into the memory 912 is enabled. When the calibrate/operate switch 918 is in an operate position, the reading of data from the memory 912 is enabled.

A read output of the memory 912 is connected to a digital input of a digital-to-analog converter 920. Thus a sequence of digital thermal-history data words read from the memory when the calibrate/operate switch 918 is in the operate position is converted into an analog thermal-history signal by the digital-to-analog converter 920. A difference amplifier 922 has an inverting input 924, a noninverting input 926, and a difference signal output 928. The inverting input 924 is connected to an analog-signal output of the digital-to-analog converter 920. The noninverting input 926 of the amplifier 922 is connected to the thermal-radiation intensity-level output 908 of the infrared-radiation sensor 906. Consequently, a signal at the difference signal output 928 of the difference amplifier 922 represents an algebraic difference between the thermal-radiation intensity-level signal from the infrared-radiation sensor 906 and a temperature-history signal from the digital-to-analog converter 920. The difference output 928 of the amplifier 922 is connected to a first summand input of a summing amplifier 929. A second summand input of the amplifier 929 is connected to a variable voltage source 932. The signal at the output of the summing amplifier 929 is the sum of the difference signal from the difference amplifier 922 and a nominal setpoint signal determined by the variable voltage source 932. The output of the summing amplifier 929 is connected to a contact of a second side of the calibrate/operate switch 918, so that when the switch is in the operate position, the output of the summing amplifier 929 is connected to a control input of a voltage-controlled pulse generator 930. The pulse generator 930 produces pulses synchronized with the main power signal whose width is determined by the voltage of the control input. The pulse output of the pulse generator 930 is connected to firing control input 936 of the welding machine 917. The width of the pulses of a train of pulses applied to the firing control input 936 of the welding machine 917 determines the magnitude of the welding current. When the calibrate/operate switch 918 is in the calibrate position, the control input of the pulse generator 930 is connected to the variable voltage source 932 for adjusting the welding current during calibration. The gain and frequency response of the difference amplifier 922 at the inverting and noninverting inputs are adjusted to provide for stable operation of the spot-welding controller 900.

It is not intended to limit the present invention to the specific embodiments described above. For example, a serial-access memory such as a recirculating shift-register memory can be used to store the standard thermal histories in the controller. Signal conditioners may be used in the controller. For example, non-linear amplifiers may be used to compensate for nonlinearities in the conversion characteristics of the radiant-energy sensors. Compensating networks may be used to stabilize the operation of the feedback loop of the controller. Light choppers of the magnetic vibrator type can be used. It is recognized that these and other changes may be made in the apparatus and method specifically described herein without departing from the scope and teachings of the invention, and it is intended to encompass all other embodiments, alternatives and modifications consistent with the present invention.

We claim:

1. A welding controller for a spot welder having a welding tip for contacting a workpiece and injecting an electric welding current into the workpiece to produce a spot weld and having a control signal input for receiving a signal for controlling the magnitude of the welding current comprising a well located in the interior of said welding tip, a thermographic phosphor disposed in said well in thermal contact with said welding tip so that the intensity of phosphorus radiation emitted by the phosphor when it is illuminated is a measure of the temperature of the phosphor, a multi-filament fiber optic cable having a trunk portion extending into said well in close proximity to said phosphor and a plurality of branches extending outwardly therefrom, a phosphor illumination source disposed adjacent the end of a first one of said branches for supplying radiation for illuminating said phosphor, first radiant-energy sensor means disposed adjacent a second one of said branches responsive to radiant-energy in a first wavelength range for producing an output signal, second radiant energy sensor means disposed adjacent the end of a third one of said branches responsive to radiant energy in a second wavelength range for producing an output signal, memory means adapted to contain data indicative of the desired thermal pattern for a weld and electronic circuit means operatively associated with said first and second sensor means and said memory means for comparing the output signals of said first and second sensor means with the data in said memory means to provide a control signal for controlling the magnitude of the welding current.

2. A welding controller according to claim 1, wherein said memory means is comprised of a digital read/write memory having a plurality of accessible storage locations for storing data words, an access-location input for locating a storage location to be accessed, a read/write enable input for specifying a read or write operation, a data-word input port, and a data-word output port; and said electronic circuit means includes timer means having a clock-signal output for emitting a sequence of clock signals at the clock-signal output at timed intervals after the initiation of a welding operation, the clock signals being spaced apart by time intervals substantially shorter than the duration of the welding operation;

access-location sequencing means having a welding-initiated signal input, a clock-signal input, and a sequencing-signal output, for generating a predetermined sequence of access-location signals at the sequencing-signal output subsequent to receipt of a signal at the welding-initiated signal input signifying initiation of a welding operation, each access-location signal being issued in response to receipt of a clock signal at the clock-signal input, the clock-signal input being connected to the clock-signal output of the timer means, and the sequencing-signal output being connected to the access-location input of the memory;

a read/write selector switch connected to the read/write enable input of the digital memory for selectively enabling one of the reading of data words from and the writing of data words into storage locations in the digital memory determined by the access-location signals generated by the access-location sequencing means, an operation mode and a calibration mode being defined by the state of the read/write selector switch, with the operation mode corresponding to the reading of data words and the calibration mode corresponding to the writing of data words;

an analog-to-digital converter having an analog signal input and a digital data output, the analog-signal input being connected to the intensity-level signal output of the sensor, and the digital-data output being connected to the data-word input port of the memory so that the data words written in the memory in response to the access-location signals when the controller is in the calibration mode characterize the thermal history of a welding operation; and differencing means having an error-signal output, a sensor-value input, and a thermal-history data word input connected to the data-word output port of the memory, for generating an error signal at the output when the controller is in the operation mode, in response to intensity-level information from the sensor applied to the sensor-value input, the error signal at a time corresponding to the issuance of an access-location signal by the access location sequencing means being an approximate measure of an arithmetic difference between the value sensor at that time and the value represented by the thermal-history data word read from the digital memory as specified by the access-location signal, the error-signal output being connected to the control-signal input of the spot welder so that the magnitude of the welding current is controlled in response to the temperature evolution of the weld.

3. The welding controller according to claim 2 in which the differencing means comprises:

a digital subtractor having a first input, a second input, and a difference output, one input being a subtrahend input and the other input being a minuend input, the first input being connected to the digital data output of the analog-to-digital converter, the first input thereby defining the intensity-level input of the differencing means, and the second input being connected to the data-word output of the digital memory, the second input thereby defining the thermal-history data word input of the differencing means so that data appearing at the difference output of the subtractor at a time corresponding to the issuance of an access-location signal is an approximate measure of an arithmetic difference between the value of the intensity level signal from the radiant-energy sensor at that time and the value represented by the thermal history data word read from the digital memory as specified by the access-location signal.

4. The welding controller according to claim 3 in which:

the spot welder is connectable to a main AC power source from which electric power for the welding current can be drawn;

the timer means includes a zero-crossing detector connectable to the main AC power source, the zero-crossing detector being adapted to emit clock signals at the clock-signal output synchronized with the zero crossings of a main AC power signal from the power source; and the differencing means further comprises:

pulse-forming means connected to the difference output of the digital subtractor and to the zero-crossing detector for emitting a pulse-width modulated error signal at the error-signal output of the differencing means, the pulse-width modulated error signal including a train of pulses separated by time intervals substantially equal to the time intervals separating the zero crossings of the main AC power signal and the width of the pulses being determined by data appearing at the difference output of the digital subtractor.

5. The welding controller according to claim 4 in which the spot welder is adapted to produce a welding current which is an AC current drawn from the main power source; and the controller further comprises:

time-delay means for compensating for a phase shift between the welding current from the spot welder and the main AC power signal.

6. The welding controller according to claim 5 in which:

the digital memory is a random-access memory having a data-word input port, a data-word output port, a read/write enable input, and an address input defining the access-location input; and the access-location sequencing means includes a digital counter having a load initial-count input defining the weld-initiating signal input, a count increment input defining the clock-signal input, and a count output defining the sequencing-signal output, so that application of the weld-initiating signal to the load-initial-count input loads the counter with an initial address which is incremented to generate successive addresses of storage locations in the random-access memory by clock signals applied to the clock-signal input.

7. The welding controller according to claim 2 further including:

a weld counter having a clear input connected to the read/write selector switch for clearing a count stored in the counter to a predetermined initial value when the controller is in the calibration mode, a count-increment input connected to the welder for incrementing the count upon carrying out a welding operation, and a count-equals-limit output at which a signal is generated when the count equals a predetermined limit; and a recalibration indicator connected to the count-equals-limit output for providing a notification when a predetermined number of welds have been carried out subsequent to storing a thermal history of a weld in the memory.

8. The welding controller according to claim 2 further comprising:

power-correction sign detector means having a welding-operation-underway input, an error-signal input connected to the differencing means, and a power-correction-sign signal output, for generating a power-correction sign signal in response to an error signal during a welding operation which specifies whether the error signal tends to increase or decrease the welding current to compensate respectively for an undertemperature or an overtemperature weld;

an overtemperature weld counter having a clear input connected to the read/write selector switch and to the power-correction-sign signal output of the power-correction-sign detector means, for clearing a count stored in the counter to a predetermined initial value when the controller is in the calibration mode and when a power correction compensating an undertemperature weld is detected, a count-increment input connected to the power-correction sign signal output for incrementing the count upon the detection of an overtemperature weld, and a count-equals-limit output at which a signal is generated when the count equals a predetermined limit; and a recalibration indicator connected to the count-equals-limit output of the overtemperature-weld counter for providing a notification when an unbroken sequence of overtemperature welds of a predetermined sequence length has been carried out subsequent to storing a thermal history of a weld in the memory.

9. The welding controller according to claim 2, further comprising a multiplexer having a first signal input, a second signal input, a signal output, and a sensor-selection input, the first and the second signal inputs being connected respectively to the intensity-level signal outputs of the first and the second radiant-energy sensor means, and the signal output being connected to the analog signal input of the analog-to-digital converter, so that an intensity-level signal from one of the first and the second sensors is applied to the analog-to-digital converter in response to a signal applied to the sensor-selection input of the multiplexer; and crossover means for generating a sensor-selection signal specifying a radiant-level energy sensor transmitting an intensity-level signal falling in a predetermined range, the crossover means having a sensor-selection output connected to the sensor-selection input of the multiplexer and a sensor-value input for receiving intensity-level information from the selected radiant-energy sensor means.

10. The welding controller according to claim 9 in which:

the first radiant-energy sensor means includes a first optical filter disposed in the optical path between the second branch optical port and the illumination port of the sensor, the first optical filter absorbing radiant energy over a wavelength range to render the first sensor means principally responsive to radiant energy in the first wavelength range; and the second radiant-energy sensor means includes a second optical filter disposed in the optical path between the third branch optical port and the illumination port of the second sensor means, the second optical filter absorbing radial energy over a wavelength range to render the second sensor means principally responsive to radiant energy in the second wavelength range.

11. The welding controller according to claim 9 in which the second sensor means is principally responsive to radiant energy in the infrared wavelength range.

12. The welding controller according to claim 11 further comprising:

an inverting amplifier connected in series with the intensity-level output of the second radiant-energy sensor means to invert the intensity-level signal from the second sensor means.

13. The welding controller according to claim 1 in which the phosphor illumination source produces ultraviolet radiation.

14. The welding controller according to claim 13 further comprising:

a light chopper for periodically interrupting the illumination of the radiant-energy sensor means, the light chopper including a movable shutter and drive means for periodically positioning the shutter in an optical path between the second branch optical port and the illumination port of the sensor to block the optical path at a chopping frequency.

15. The welding controller according to claim 10 in which the phosphor illumination source comprises:
an ultraviolet lamp; and a lamp power supply connected to the lamp for energizing the lamp, the lamp power supply being adapted to produce a power-supply voltage of a frequency substantially different from the chopping frequency.

16. The welding controller according to claim 15 in which the power supply voltage is a DC voltage.

17. The welding controller according to claim 15 in which the lamp power supply and the timer means are connectable to a line-frequency AC power source, the lamp power supply being adapted to produce an AC power-supply voltage at the line frequency, and the timer means being adapted to emit clock signals in synchronism with the line frequency.

18. A process for controlling a welding current for a spot welding operation carried out on a workpiece comprising:
(a) directing ultraviolet radiation through at least one fiber optic filament onto a thermographic phosphor disposed in a well in thermal contact with a welding tip,
(b) directing the radiation emitted by the phosphor through at least one fiber optic filament to a first radiant-energy sensor to provide an output signal indicative of a temperature in a low temperature range for the welding tip,
(c) directing infrared radiation emitted from the welding tip within said well through at least one fiber optic filament to a second radiant-energy sensor to produce an output signal indicative of a temperature in a higher temperature range for the welding tip, comparing the sequential output signals of said first and second sensors during a spot welding operation to a corresponding sequence of standard thermal history values to obtain a sequence of error values and continually adjusting the magnitude of the welding current in response to the sequence of error values to reduce differences between the temperature at the welding site in the workpiece during the course of a spot welding operation and the standard thermal history.

19. A welding tip for a spot welding machine having a welding controller for controlling a welding current in response to infrared radiation providing a measure of a temperature of a weld, the welding tip comprising:
(a) a generally cylindrical shank made of an electrically conductive material, an end surface of the shank defining a contact surface for making mechanical and electrical contact with a workpiece to transmit a welding current to the workpiece, the end of the shank opposite to the contact surface being securable to the spot welding machine in an electrically contacting relationship to receive the welding current from the machine, the shank having a passageway through it, the intersection of the passageway with the contact surface defining a thermal-radiation entrance port; and
(b) a window element made of a material which is transparent to infrared radiation and capable of enduring temperatures of up to about 600° C., the window element being fitted in passageway of the shank.

20. The welding tip according to claim 19 in which the window element is made of sapphire, ruby, diamond, sintered aluminum oxide or a machinable glass ceramic.

21. The welding tip according to claim 19 in which the passageway extends generally coaxially through the shank of the welding tip, and is generally circular in crossection; and the window element has a right-circular-cylindrical shape with a diameter substantially equal to the inside diameter of the passageway at the entrance port, the window element being positioned in the passageway of the shank of the welding tip with an end of the window substantially flush with the contact surface.

* * * * *